United States Patent [19]

Miyata et al.

[11] Patent Number: 4,974,921
[45] Date of Patent: Dec. 4, 1990

[54] LIGHT BEAM SCANNING APPARATUS

[75] Inventors: Shin Miyata; Hiroaki Kojima; Yasuhiro Matsuura; Hirofumi Hasegawa; Yukio Yamada; Naoto Ohmori, all of Osaka, Japan

[73] Assignee: Minolta Camera Kabushiki Kaisha, Osaka, Japan

[21] Appl. No.: 268,730

[22] Filed: Nov. 8, 1988

[30] Foreign Application Priority Data

Nov. 10, 1987 [JP] Japan ............................ 62-284780
Nov. 10, 1987 [JP] Japan ............................ 62-284781
Nov. 10, 1987 [JP] Japan ............................ 62-284782

[51] Int. Cl.$^5$ .................. G02B 26/10; G01D 15/14
[52] U.S. Cl. .................................. 350/6.8; 346/160
[58] Field of Search ............ 350/6.1, 6.2, 6.3, 6.4, 350/6.5, 6.6, 6.7, 6.8, 6.9, 6.91, 3.71, 618, 622; 346/160

[56] References Cited

FOREIGN PATENT DOCUMENTS

8203924 11/1982 PCT Int'l Appl. ................ 350/6.7

Primary Examiner—Bruce Y. Arnold
Assistant Examiner—Ronald M. Kachmarik
Attorney, Agent, or Firm—Price, Gess & Ubell

[57] ABSTRACT

An apparatus provided with a first reflector for reflecting a light beam deflected by a deflector in a light beam scanning apparatus and a second reflector for directing the light beam from the first reflector toward an image forming point after contacting again the first reflector. The light beam is reciprocated between the first and second reflectors thereby forming a light path of two times the space that they are disposed. A deflector is disposed on a side of the light path extending from the first reflector to the light beam image forming point together with a light beam emitting source which irradiate the light beam on the same level of the light path and make the light path length at both ends of the light beam scanning range equal to each other by arranging an angle between the first and second reflectors.

16 Claims, 7 Drawing Sheets

Fig.1
PRIOR ART

Fig.2
PRIOR ART $\Delta_0 = \Delta_1$

LIGHT BEAM SCANNING APPARATUS

BACKGROUND OF THE INVENTION

1. Field of the Invention

The present invention relates to a light beam scanning apparatus preferably applicable to a laser beam printer and the like, and more particularly to a light scanning apparatus without having an fθ lens which is generally used for obtaining constant speed for scanning when scanning is performed by deflecting light beam with a deflecting means such as polygon mirror and holoscanner.

2. Brief Description of the Prior Art

Figure 1:
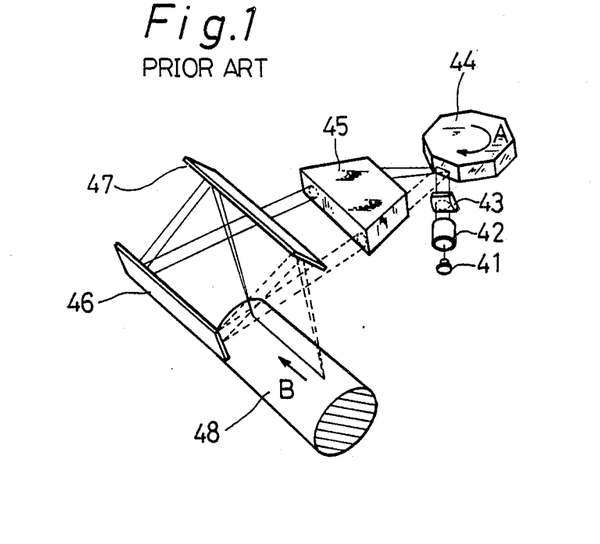
FIG. 1 is a perspective view illustrating a conventional light beam scanning apparatus provided with an fθ lens.

FIG. 1 shows a light beam scanning apparatus provided with an fθ lens adopted in the conventional laser beam printers. The apparatus comprises a laser diode 41 for irradiating laser beam, a collimator lens 42 for converging the laser beam on the point of image formation, a cylindrical lens 43, a polygon mirror 44 or a holoscanner to be utilized as a deflecting means for a scanning laser beam, an fθ lens 45 and a pair of turning mirrors 46,47. When the polygon mirror is rotated in the direction of arrow A, the point of image formation of the laser beam is moved in the direction of arrow B on a photoconductive drum 48 and scanning is performed thereon.

Figure 2:
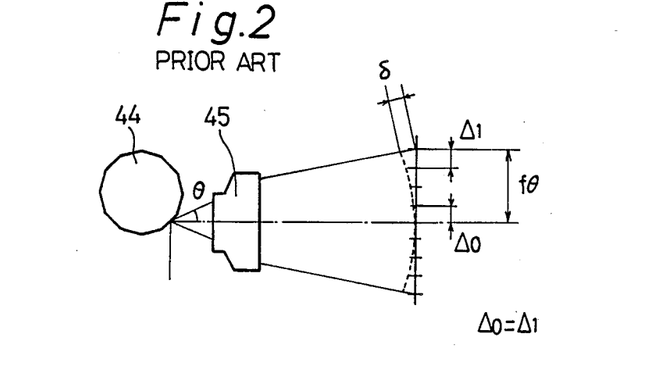
FIG. 2 is a plan view explaining the function of the fθ lens.

The cylindrical lens 43 is arranged to eliminate the effect of beam deflection caused by inclination of the surface of reflection by making good use of a combined effect with the toric function of the fθ lens 45 by horizontally diaphragming the laser beam on the surface of reflection of the polygon mirror 44. The fθ lens 45 is capable of performing fθ function to convert circular uniform motion of the polygon mirror 44 to a linear motion with constant velocity on the photoconductive drum 48, which will be described referring to FIG. 2.

The laser beam deflected in the θ direction by the polygon mirror 44 is formed at the position of image height f.θ, and a degree of equalized pitch is secured by making the very small scanning width $\Delta_0$ in the central portion equal to the very small scanning width $\Delta_1$ at the edge of scanning portion. The fθ lens 45 also functions to correct the curve of the image surface. If there is no fθ lens 45, the image forming surface forms a circular arc with a point of deflection on the polygon mirror at its center as shown by a broken line in FIG. 2 thereby creating the amount of defocus δ in the edge portion when focus is made in the central portion.

Japanese Published Examined Patent Application No.18163/1986 discloses a light scanning apparatus with an fθ lens removed, wherein fθ function is electrically corrected. However, curve correction on an image forming surface is not being made. While, Japanese Published Unexamined Patent Application No.4109/1977 discloses an apparatus utilizing a parabolic mirror in place of an fθ lens.

In the case of FIG. 1, a polygon mirror 44, an fθ lens 45 and the like are disposed in superposed relation on the above of the scanning width, however, Japanese Published Unexamined Patent Application No.172013/1985 discloses an apparatus wherein a laser beam emitting source, a hologram deflection device, an fθ lens and the like are disposed on a side of a scanning light path.

However, a laser beam printer utilizing an fθ lens is costly because the fθ lens is an expensive part comprising a multiplicity of high precision lenses. The apparatus which is arranged to electrically correct the fθ function is complicated for controlling and the correction of curve on the image forming surface can not be made without problems on the precision. Further, an apparatus utilizing a parabolic mirror needs a larger space to be disposed therein and the cost can not be reduced substantially.

In a conventional laser beam printer wherein an fθ lens is utilized, an optical system is constructed compactly by utilizing turning mirrors 46,47 since the light path length from the polygon mirror 44 to the photoconductive drum 48 is as long as or more than 200 mm. However, for making a laser printer compactly, a problem of space for accommodating the optical system arises as the light path length becomes longer. Under such condition, it is necessary to arrange a cartridge in an electrophotographic section not to interfere with the light path between a laser beam scanning optical system and an electrophotographic section provided thereunder. Further, a moving space required for attaching and detaching the cartridge has also to be taken into consideration which eventually makes it difficult to limit the height of a laser printer.

Japanese Published Unexamined Patent Application No.279869/1986 discloses an apparatus which is arranged to fully open upwardly into an upper unit from a lower unit which stores a laser beam scanning system when a cartridge disposed around a photoconductive drum is exchanged. If such a structure is adapted, no consideration need to be given for space for moving cartridges, however, a large-scale structure for opening and closing the upper unit needs to be provided thereby inviting a high cost in producing the apparatus.

SUMMARY OF THE INVENTION

The main object of the present invention is to provide a compact light beam scanning apparatus without using an fθ lens.

Another object of the present invention is to provide a compact and economical light beam scanning apparatus without using an fθ lens which is capable of limiting any unequality of the scanning motion and the amount of defocus within a permissible range without resorting to any specific correcting means in place of the fθ lens.

Still another object of the present invention is to provide a compact light beam scanning apparatus without using an fθ lens and a laser beam printer which is constructed in compact configuration by utilizing in common a portion of light scanning path of the light beam scanning apparatus as a space for disposing an attachable and detachable unit around a photoconducrtive drum in an electrophotographic image forming section.

The other objects and features of the present invention will become more apparent from the following description taken in conjunction with the accompanying drawings which illustrate specific embodiments of the invention.

DETAILED DESCRIPTION OF THE INVENTION

Embodiments of the present invention will now be described below referring to the accompanying drawings.

FIGS. 3 through 9 illustrate the first embodiment of the present invention which is applied to a laser beam printer without having an fθ lens.

Figure 3:
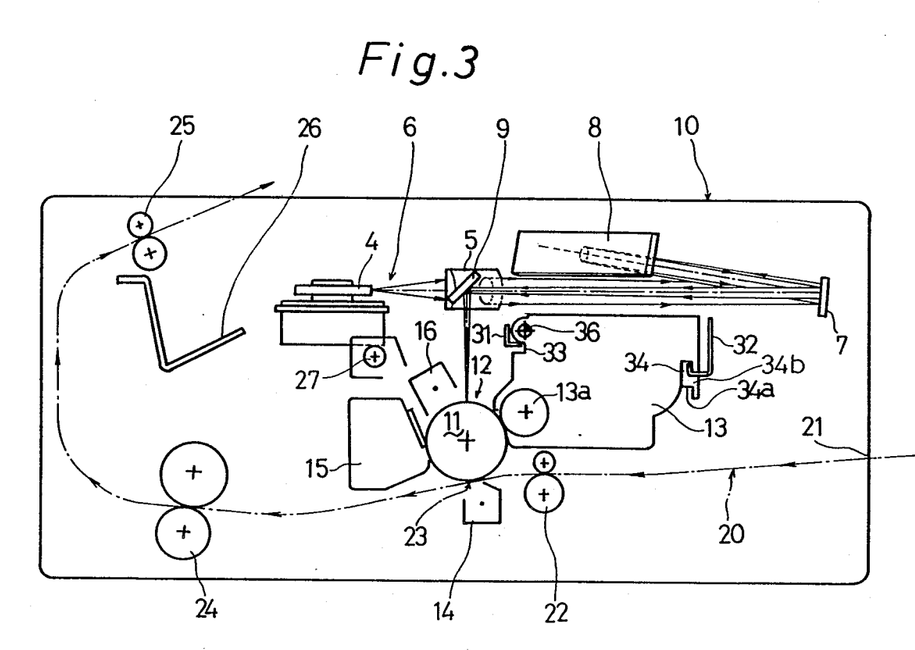
FIG. 3 is a schematic front view showing the whole structure of a laser beam printer without having an fθ lens to which the first embodiment of the present invention is applied.
Figure 4:
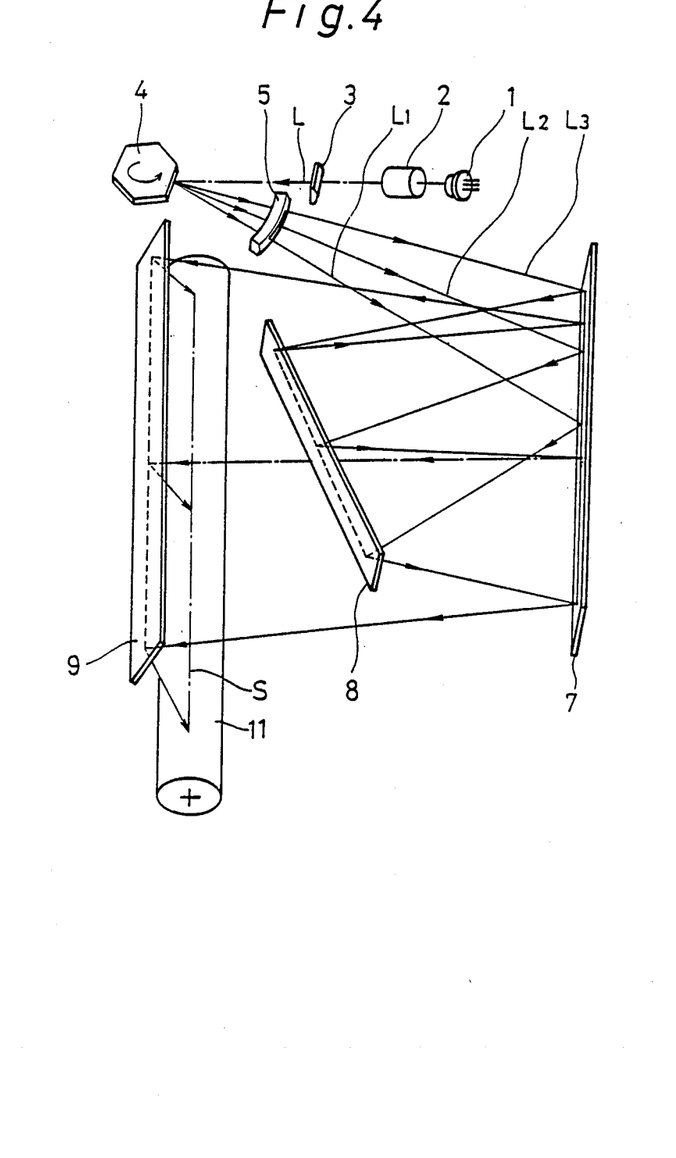
FIG. 4 is a perspective view of the light beam scanning optical system in FIG. 3.
Figure 5:
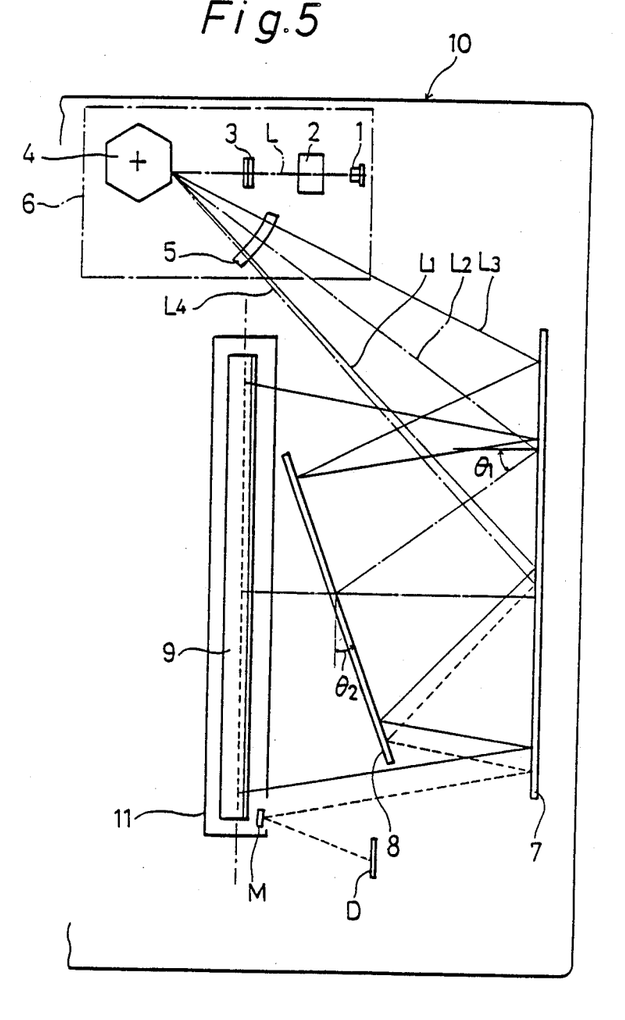
FIG. 5 is a plan view of the light beam scanning optical system in FIG. 4.

In FIGS. 3 through 5, designated by numeral 1 represents a laser diode as a laser beam emitting source, 2 a collimator lens as an image forming means, 3 a cylindrical lens, 4 a polygon mirror as a deflecting means and 5 a toroidal lens, and they are unified into a laser beam scanning unit 6 which is disposed in the rear upper side of a laser beam printer as shown in FIG. 3, that is, the laser beam scanning unit 6 is disposed on one side of an upper space provided for arranging various driving devices to be disposed therein in the main body 10 of the laser beam printer.

The numeral 11 represents a photoconductive drum of the main body of laser beam printer 10, and the laser beam scanned by the laser beam scanning unit 6 forms an image on the photoconductive drum 11 through a first reflector 7, a second reflector 8 and a third reflector 9, and scans the surface of the photoconductive drum 11 in its axial direction.

The first reflector 7 is disposed along an axial direction of the photoconductive drum 11, i.e. in parallel with the scanning direction of the laser beam. The second reflector 8 is disposed nearer to the photoconductive drum 11 than the first reflector, and is arranged to receive the laser beam reflected by the first reflector and then reflects again the light toward the first reflector 7. The third reflector 9 is disposed above the photoconductive drum 11 in parallel with its axis and in a horizontal direction opposite to the first reflector 7, and is arranged to receive the laser beam secondarily reflected by the first reflector 7 to reflect the light toward the photoconductive drum 11.

The second reflector 8 is disposed on the side position of the laser beam path which is deflected from the laser beam scanning unit 6 toward the first reflector 7, and is in a position not to interfere with the light path directed from the first reflector 7 to the third reflector 9. The second reflector 8 is disposed in an inclined posture against the first and third mirrors 7,9 that are disposed in parallel with respect to each other so as to make the light path length of the laser beam entering in one end of the photoconductive drum and the other end as equal.

Around the photoconductive drum 11, an exposure section 12 to which a laser beam is irradiated from the third reflector 9, a developing cartridge 13 for developing by toner an electrostatic latent image formed on the photoconductive drum in the exposure section 12, a transfer charger 14 for transferring a toner image onto a transfer sheet, a cleaner 15 for cleaning the photoconductive drum 11 after transfer, an eraser 27 for erasing residual charge on the surface of the photocnductive drum after cleaning and a main charger 16 for electrifying photoconductive surface of the drum 11 are sequentially disposed in the clockwise direction.

The paper feed path 20 comprises a transfer sheet feed inlet 21, a register roller 22 for feeding a transfer sheet simultaneously with the movement of a toner image formed on the photoconductive drum to a transfer section 23 which is positioned between the photoconductive drum 11 and a transfer charger 14, a fixing section 24 for fixing a toner image transferred onto a transfer sheet, a discharge roller 25 for discharging a transfer sheet after the fixing process and a discharge tray 26.

Figure 6:
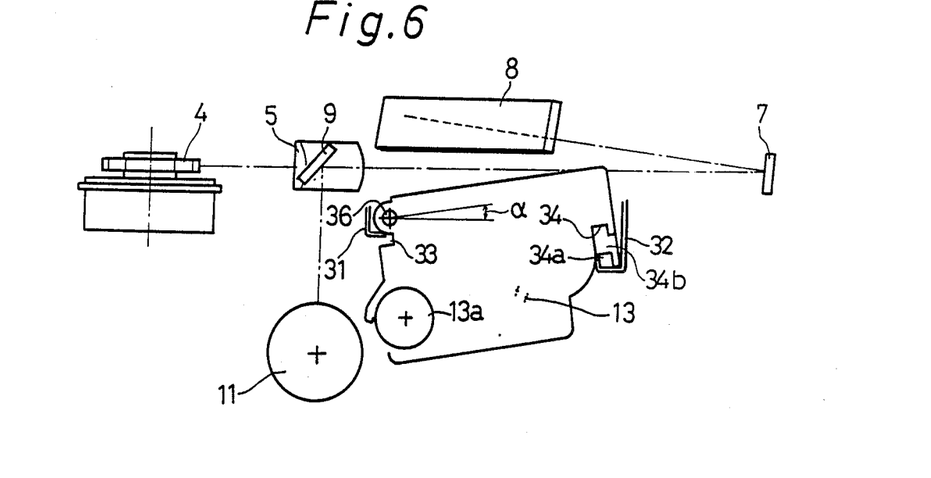
FIG. 6 is an enlarged side view showing the state when a developing cartridge in FIG. 3 is attached and detached.
Figure 7:
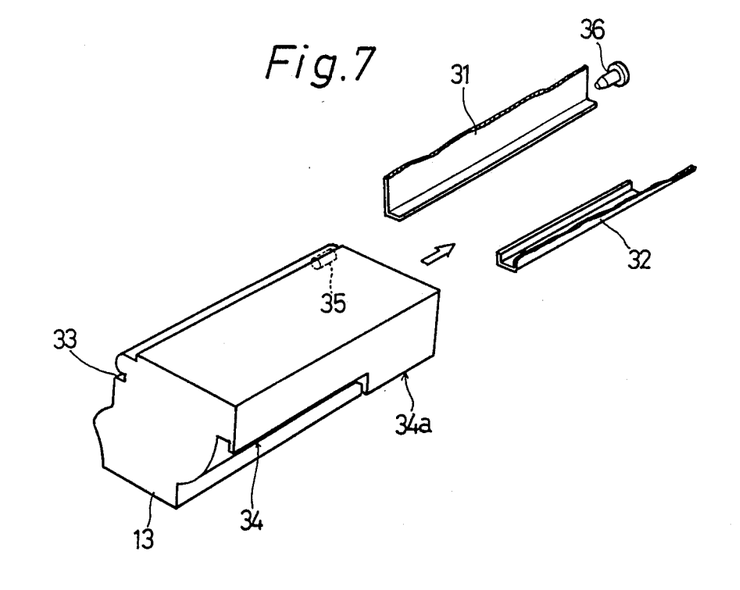
FIG. 7 is a decomposed perspective view illustrating a structure for attaching and detaching a developing cartridge.

The developing cartridge 13 is disposed just under the light path between the first reflector 7 and the third reflector 9 and is slidably attached or detached along a pair of guide members 31,32 in the axial direction of the photoconductive drum 11 as illustrated in detail in FIGS. 6 and 7. In order to facilitate this action, on both sides of the upper portion of the cartridge 13, a lateral groove 33 is provided on one side near the photoconductive drum 11 to engage with an L-shaped guide member 31 while another groove 34 facing downward is arranged on the other side furthest from the photoconductive drum 11 to engage with a hooked guide member 32.

At the inner part of the groove 34 in the drawing direction, the portion 34a protruding downward is formed, and the guide member 32 is arranged shorter in length so that the protruded portion 34a of the developing cartridge 13 falls into the cutout portion of the guide member 32 when the cartridge is set at a predetermined position.

When the protruded portion 34a comes off the guide member 32, one side of the developing cartridge 13 is supported by engagement of the guide member 31 with the lateral groove 33 while the other side tends to drop. However, the groove 34, in place of the protruded portion 34a, engages with the guide member 32 to stabilize the position as shown in FIG. 3. This is the manner in how the developing cartridge 13 is set, and a developing sleeve 13a becomes positioned adjacent the circumferential surface of the photoconductive drum 11. Under such state, the cartridge 13 can not be taken out since the portion 34b between the groove 34 and the protruded portion 34a functions as a stopper by hooking with the inner edge of the guide member 32. In order to take out the cartridge 13, therefore, it is necessary to hold up the other side of the cartridge 13 until the stopper function comes off as shown in FIG. 6.

Accordingly, the engagement of the protruded portion 34a with the guide member 32 and also the engagement of the groove 3 with the guide member 31 makes it possible to take out the developing cartridge 13 in a stable manner. By holding up the other side of the cartridge 13, the sleeve 13a is separated from the photoconductive drum 11 so that the photoconductive drum is protected from damage by the developing sleeve 13a when the cartridge is set or taken out. The stopper function assures the safety drawing of the cartridge 13 and also presents the cartridge from any careless handling.

The developing cartridge 13 is also provided with an engaging hole 35 on its upper surface of inner edge on one side, and when the cartridge 13 is set, the hole 35 is engaged with a pivotal pin 36 fixed on a side of the main body 10 of the laser beam printer just before the protruded portion 34a comes off the guide member 32. With this engagement, the movement of the cartridge 13 is smoothly and stably guided when one side of the cartridge is dropped and held up again.

The function provided with the aforementioned structure will now be described. The laser beam L irradiated from the laser diode 1 is projected on the rotating polygon mirror 4 after being converged by the collimator lens 2 to form an image on the photoconductive drum 11, and is then reflected against the first reflector 7 and at the same time is deflected on the surface of rotation of the polygon mirror within a range of a predetermined angle.

$L_1$ represents a laser beam corresponding to the Start of Image (SOI), $L_2$ the Center of Image (COI) and $L_3$ the End of Image (EOI). The $L_4$ in FIG. 5 represents a laser beam corresponding to the Start of Scan (SOS).

The laser beam emitted from the polygon mirror 4 enters the first reflector 7 at an angle $\theta_1$ and a reflected laser beam enters the second reflector 8. The second reflector 8 is slantingly disposed by an angle $\theta_2$ (Approx. $\theta_1/2$) to the first reflector 7 so as to make the light path length of the SOI laser beam $L_1$ equal to that of the EOI laser beam $L_3$, and the laser beam entered therein is reflected again to the first reflector 7. The laser beam again reflected at the reflector 7 then enters the third reflector 9 and forms an image on the circumferential surface of the photoconductive drum 11 through the third reflector 9. At the same time, the point of image formation is moved towards the axial direction of the drum 11 by the rotation of the polygon mirror 4 and scanning is made.

The SOS beam $L_4$ enters a sensor D by reflection of a reflector M disposed on the side of the third reflector 9. The longer light path length can thus be prepared from the polygon mirror 4 to an image forming point, i.e., to the circumferential surface of the photoconductive drum 11, in a compact structure by disposing the polygon mirror 4 on the side of the scanning width of the photoconductive drum 11 whereby the laser beam enters the first reflector 7 at an angle and is reciprocately travelled through the light path between the first reflector 7 an the second reflector 8 thereby securing a required equal pitch without a disposing $f\theta$ lens, and the amount of defocus can be maintained within a permissible range.

Figure 8:
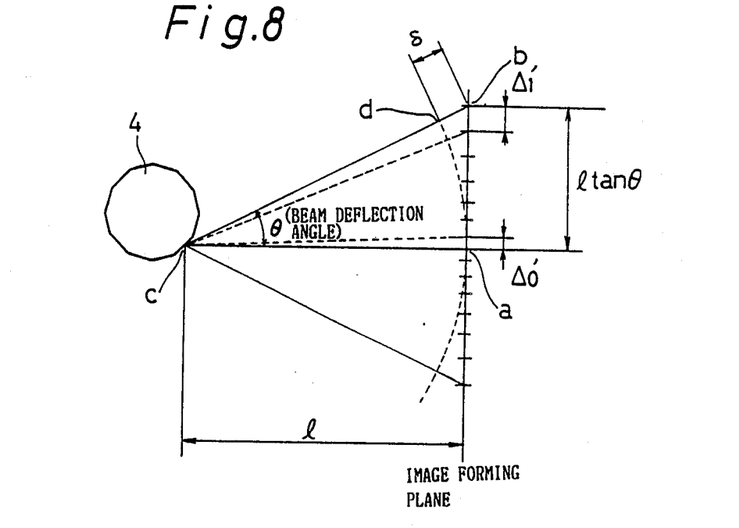
FIG. 8 is a plan view explaining the function of the first embodiment of the present invention.

For a more detailed description, if there is not $f\theta$ lens and when the distance from the polygon mirror 4 to an image forming surface is designated a l, and the angle of deflection of the laser beam $\theta$, the height of image on the photocnductive drum 11 becomes $l\tan\theta$ (as shown in FIG. 8), and the scanning speed is increased as it travels to the end of the scanning width. The micro scanning widths at the end $\Delta_1'$ and at the central portion $\Delta_1'$ are not equal and an equal pitch can not be secured. Besides, the image forming surface forms a circular arc centering on the point of deflection of the polygon mirror, and when focus is made at the central portion a of the scanning width, an image is formed at the end portion d of the scanning width thereby inviting the amount of defocus $\delta$ against b point on the photoconductive drum 11.

However, the scanning speed being an angle differential of the image height $l\tan\theta$, $1/\cos^2\theta$ is given and an equal pitch can be expressed by the ratio of speed in the central portion ($\theta=0$) as $1/\cos^2\theta$, which means that if $\theta$ becomes larger, the pitch is widen, and conversely, when the maximum angle of deflection$\theta$max is made smaller, equal pitch can be maintained.

The amount of defocus$\delta$ can be expressed by $1/\cos\theta-1$ which is the difference in distance between c, b and c, d, which means that if $\theta$ is smaller, the amount of defocus becomes smaller. The maximum angle of deflection $\theta$max of the laser is expressed by $\tan^{-1}(k/2l)$ when the maximum scanning width is designated as k, and if the l becomes larger, $\theta$max becomes smaller.

Figure 9:
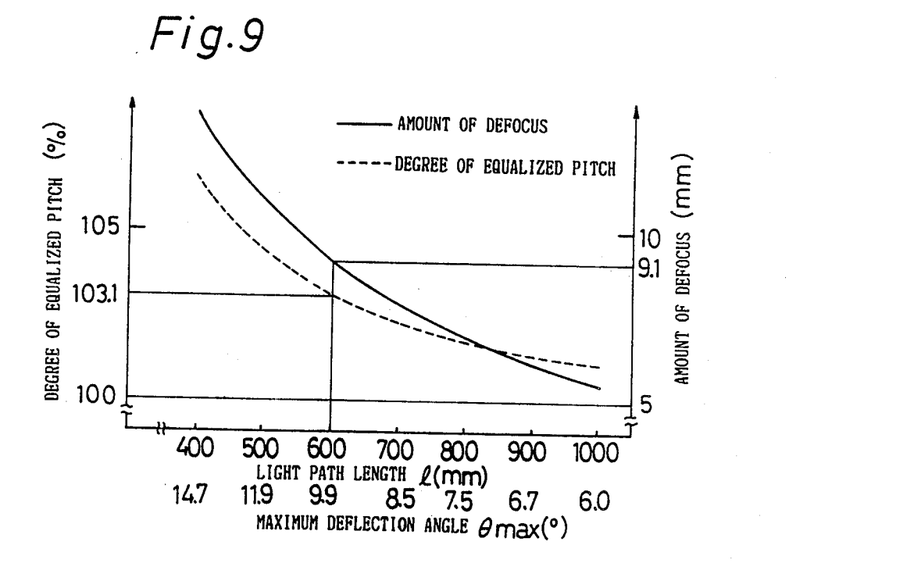
FIG. 9 is a graph showing a relation between light path length, degree of equalized pitch and the amount of defocus.

FIG. 9 shows a variation of the degree of equalized pitch and he amount of defocus against the light path length and the maximum angle of deflection $\theta$max when the maximum scanning width is designated as 210 mm. As it is clear from FIG. 9, a required degree of equalized pitch can be secured by lengthening the l, and at the same time, the amount of defocus can be brought within a predetermined value.

In case it is expressed with a numerical value, when a degree of equalized pitch is set at ±5%, l becomes more than 332 mm. When the diameter of the beam is 70μm with its permissible increment ±10%, the amount of defocus will be ±6.5 mm, and l becomes more than 416 mm. Accordingly, if the l is longer than 400 mm, the degree of equalized pitch and the amount of defocus may be maintained within a usable rang. For instance, when the light path length is set at 600 mm, the degree of equalized pitch may be kept at approx. ±1.5% with the amount of defocus at approx. ±4.5 mm, and a practically workable image can be obtained. The maximum limit of l is considered to be about 1000 mm by reason of the light amount required on the photoconductive drum 11. Accordingly, the permissible value for l ranges from 400 mm to 1000 mm, and the range from 600 mm to 1000 mm will be the most preferable.

By converging the vertical width of the laser beam on the polygon mirror 4 with the cylindrical lens 3 and passing the reflected light rom the polygon mirror 4 through the toroidal lens 5, any bad effect caused by the inclination of the polygon mirror 4 to the rotating axis of the reflecting surface, i.e. the vertical deflection of the beam may be eliminated.

The laser beam scanning unit 6 is arranged on the side of the photoconductive drum 11 in its axial direction, and therefore, reflectors only are disposed above various apparatus disposed around the photoconductive drum 11 thus decreasing the height of the main body 10 of laser printer.

The second reflector 8 is arranged on the side of the light path extending from the polygon mirror 4 to the first reflector 7 and above the light path extending from the first reflector 7 to the third reflector 9. Accordingly, the second reflector 8 can be disposed at a position above the light path with a small diameter so that the height of the main body can be decreased horizontally. For instance, the diameter of a beam just emitted from the toroidal lens 5 is approx. 15 mm while the beam diameter becomes 2 mm at the lower position of the second reflector 8 making a difference of approx. 5 mm in height.

When the developing cartridge 13 is attached or detached for an exchange, one side of the cartridge is pivotally moved upwardly around the pivotal pin 36 up to the height shown in FIG. 6, and the side of the cartridge impinges on the light path extending from the first reflector 7 to the third reflector 9. However, such trespass is made only when the printer is not being used, and therefore, the cartridge can be disposed at the position adjacent the light path thereby restraining the vertical length of the whole body of the printer.

In the first embodiment, an example was shown wherein the first reflector 7 is disposed in parallel with the axial direction of the photoconductive drum 11. However, a first reflector 17 may be slantingly disposed against the axial direction of the photoconductive drum 11 with the second reflector 18 in parallel. In this case, the angle of inclination $\theta_3$ of the reflector 17 becomes as $\theta_1/4$ (see FIG. 10).

Figure 10:
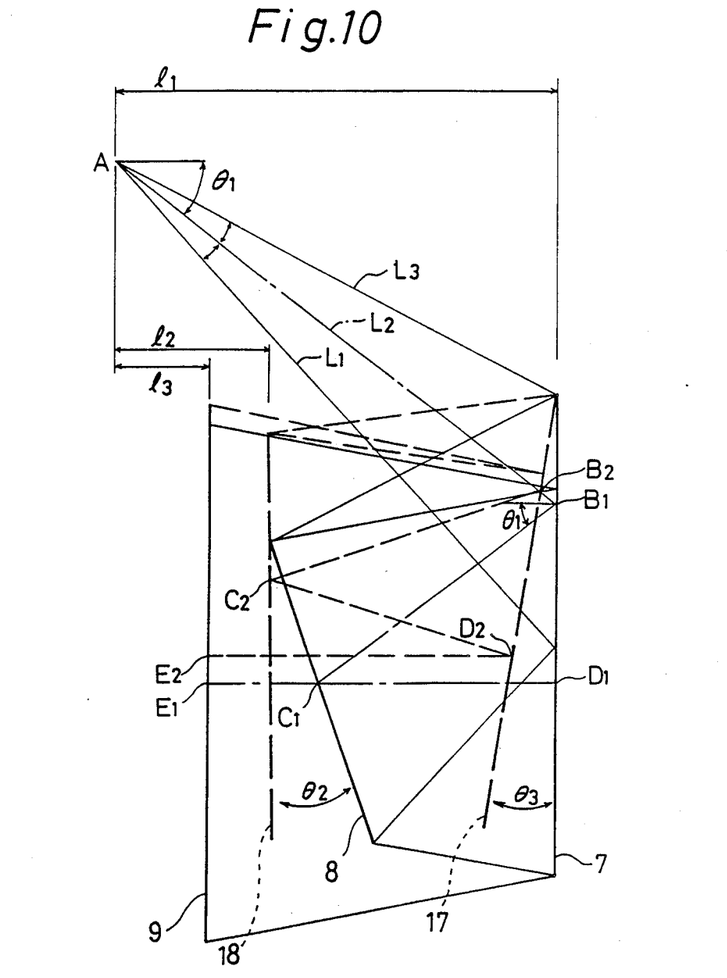
FIG. 10 is a plan view illustrating how a reflector in the second embodiment of the present invention is disposed in comparison with the first embodiment of the present invention.

When the light path length is compared on the condition that the distance from the deflecting point A of the polygon mirror 4 to the first, second and third reflectors $l_1 l_2$ and $l_3$ are the same as that of the first embodiment, the COI laser beam $L_2$ passes through the light path $A \rightarrow B_1 \rightarrow C_1 \rightarrow D_1 \rightarrow E_1$ in the first embodiment, while it passes through the light path $A \rightarrow B_2 \rightarrow C_2 \rightarrow D_2 \rightarrow E_2$ in the second embodiment, wherein the $A \rightarrow C_1$ and $A \rightarrow C_2$ are almost equal but $C_1 \rightarrow E_1$ becomes a longer light path length than $C_2 \rightarrow E_2$. Thus, the longer light path length can be secured in the first embodiment.

The number of reflectors and method for positioning the reflectors are not limited to the embodiment described above, and can preferably be designed based on the principles of the structure of the present invention.

As a deflecting means, holoscanners and the like may be utilized and the invention is not limited to the polygon mirror.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A light beam scanning apparatus for scanning a light beam on a photoreceptor without using an $f\theta$ lens, comprising:
   a beam emitting means or emitting the light beam;
   a deflector for deflecting the light beam emitted from the beam emitting means;
   a light path forming means for forming a light path for the scanning beam emitted from the deflector including at least a first and a second reflector, the first and second reflectors being arranged to reflect the beam from the first to the second and again back to the first reflector;
   wherein the deflector is disposed on a side of the light path forming means in an axial direction of the photoreceptor, and the first and/or second reflector is slantingly provided relative to an optical axis which is directed to the center of the photoreceptor through the light path in order to make the light path length at both ends of the beam scanning range equal to each other.

2. A light beam scanning apparatus as defined in claim 1, wherein the second reflector is disposed above the light path extending from the deflector to the first reflector.

3. A light beam scanning apparatus as defined in claim 2, further comprising a third reflector for guiding the light beam from the first reflector to the photoreceptor, wherein the first, second and third reflectors are disposed in such a way that the light path from the deflector to the first reflector and the one from the first reflector to the third reflector are contained in substantially the same plane.

4. A light beam scanning apparatus as defined in claim 1, wherein the light path length is set between 400 mm to 1000 mm.

5. A light beam scanning apparatus as defined in claim 1, wherein the light path length is st between 600 mm to 100 mm.

6. A printer for forming an image by scanning a light beam on a photoreceptor without using an $f\theta$ lens, comprising:
   an image forming means including an access means to the photoreceptor;
   a beam emitting means or emitting the light beam;
   a deflector for deflecting the beam emitted from the beam emitting means;
   a light path forming means for forming light paths for the scanning beam emitted from the deflector including at least a first and a second reflector, the first and second reflectors being arranged to reflect the beam from the first to the second and again back to the first reflector, and
   a holding means for holding the access means attachable and detachable under the light path extending from the first reflector to the photoreceptor, the holding means being so arranged as to hold the access means to remove it after entering into the light path of the light path forming means when the access means is removed.

7. A printer as defined in claim 6, wherein the second reflector is disposed above the light path extending from the deflector to the first reflector.

8. A printer as defined in claim 7, further comprising a third reflector guiding the light beam from the first reflector to the photoreceptor, wherein the first, second and third reflectors are disposed in such a way that the light path from the deflector to the first reflector and the one from the first reflector to the third reflector are contained in substantially the same plane.

9. A printer as defined in claim 6, wherein the beam emitting means and the deflector are disposed on a side of the light path forming means, and the first and/or second reflector is slantingly provided relative to the light path in order to make the light path length at both ends of the scanning range equal to each other.

10. A printer as defined in claim 6, wherein the light path length is set between 400 mm to 1000 mm.

11. A printer as defined in claim 6, wherein the light path length is set between 600 mm up to 1000 mm.

12. In an improved laser printer of a compact configuration having a laser beam that records images on a photoreceptor surface, the improvement of an optical scanning unit comprising:
   means for sweeping the laser beam across the photoreceptor surface;
   a first elongated reflector for receiving and reflecting toward the photoreceptor surface the sweeping laser beam, and means for reflecting the laser beam as reflected from the first elongated reflector including a second smaller elongated reflector having a reflecting surface, a plane containing a surface of the first reflector is positioned at an acute angle to a plane containing a surface of the second reflector, the planes are also relatively tilted, wherein the sweeping laser beam is twice reflected from the first reflector surface at displaced positions along the first reflector surface.

13. The improved laser printer of claim 12 wherein the optical scanning unit consists of only the means for sweeping, the first reflector and the means for reflecting which also includes only the second reflector and a third reflector for reflecting the sweeping laser beam reflected from the first reflector surface onto the photoreceptor surface.

14. The improved laser printer of claim 12 wherein the second reflector surface is positioned at a point equidistance between an optical length from the means for sweeping and the photoreceptor surface.

15. A laser printer of a compact configuration having a laser beam that records images on a photoreceptor surface, the laser printer comprising:
  means for deflecting and sweeping the laser beam on the photoreceptor surface including means for providing an optical path between the deflecting means and the photoreceptor surface;
  an access means for acting on the photoreceptor surface, and
  a holding means for holding said access means attachable and detachable, said holding means being so arranged to hold said access means in a position close to the optical path and to release said access means in another position where said access means enters into the optical path.

16. A laser printer as claimed in claim 15, wherein said optical path providing means includes at least one reflector through which the laser beam is directed to the photoreceptor surface and said access means enters in the optical path at a portion upstream or downstream of the reflector.

* * * * *